(12) United States Patent
Patel et al.

(10) Patent No.: US 7,399,015 B2
(45) Date of Patent: Jul. 15, 2008

(54) UNDERRUN ENERGY-ABSORBING STRUCTURE FOR A VEHICLE

(75) Inventors: Deepak Patel, Canton, MI (US); Bhimaraddi Alavandi, Canton, MI (US); Thiag Subbian, Farmington Hills, MI (US); Djamal Midoun, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 126 days.

(21) Appl. No.: 11/538,297

(22) Filed: Oct. 3, 2006

(65) Prior Publication Data

US 2008/0079273 A1 Apr. 3, 2008

(51) Int. Cl.
*B60R 19/34* (2006.01)
(52) U.S. Cl. ........................ 293/133; 293/155
(58) Field of Classification Search ................ 293/132, 293/133, 143, 155; 296/187.03, 187.09, 296/187.1
See application file for complete search history.

(56) References Cited

U.S. PATENT DOCUMENTS

| | | | |
|---|---|---|---|
| 4,468,052 A * | 8/1984 | Koike | 280/784 |
| 5,080,410 A | 1/1992 | Stewart et al. | |
| 5,803,514 A | 9/1998 | Shibuya et al. | |
| 5,829,805 A | 11/1998 | Watson | |
| 6,068,329 A | 5/2000 | Miller | |
| 6,089,629 A * | 7/2000 | Hope et al. | 293/132 |
| 6,176,530 B1 * | 1/2001 | Gollungberg | 293/133 |
| 6,179,355 B1 | 1/2001 | Chou et al. | |
| 6,334,638 B1 | 1/2002 | Yamamuro et al. | |
| 6,398,275 B1 | 6/2002 | Hartel et al. | |
| 6,428,065 B2 | 8/2002 | Sato et al. | |
| 6,485,072 B1 | 11/2002 | Werner et al. | |
| 6,652,010 B1 * | 11/2003 | Huddle et al. | 293/102 |
| 6,712,411 B2 | 3/2004 | Gotanda et al. | |
| 6,854,574 B2 * | 2/2005 | Yoshida et al. | 188/371 |
| 7,086,674 B2 * | 8/2006 | Goertz | 293/132 |
| 7,090,267 B2 * | 8/2006 | Pendarvis | 293/155 |
| 7,201,413 B2 * | 4/2007 | Hillekes et al. | 293/133 |
| 2002/0101085 A1 | 8/2002 | Gehringhoff et al. | |
| 2005/0179268 A1 * | 8/2005 | Kollaritsch et al. | 293/133 |
| 2006/0043743 A1 | 3/2006 | Shuler et al. | |
| 2007/0176443 A1 * | 8/2007 | Yasuhara et al. | 293/133 |

* cited by examiner

*Primary Examiner*—D. Glenn Dayoan
*Assistant Examiner*—Greg Blankenship
(74) *Attorney, Agent, or Firm*—Gigette M. Bejin; Dickinson Wright PLLC

(57) ABSTRACT

An underrun energy-absorbing structure (14) ("structure") for a vehicle (10) includes a rail member (16), a deformable crush tube (18), and a plate (20). Rail member (16) is formed from an inboard panel (22) and an outboard panel (24). Crush tube (18) is sandwiched between inboard panel (22) and outboard panel (24) and extends perpendicularly from rail member (16). Plate (20) is adjacent to crush tube (18) and extends perpendicularly from rail member (16). Plate (20) is supported by crush tube (18) during a vehicle collision.

20 Claims, 3 Drawing Sheets

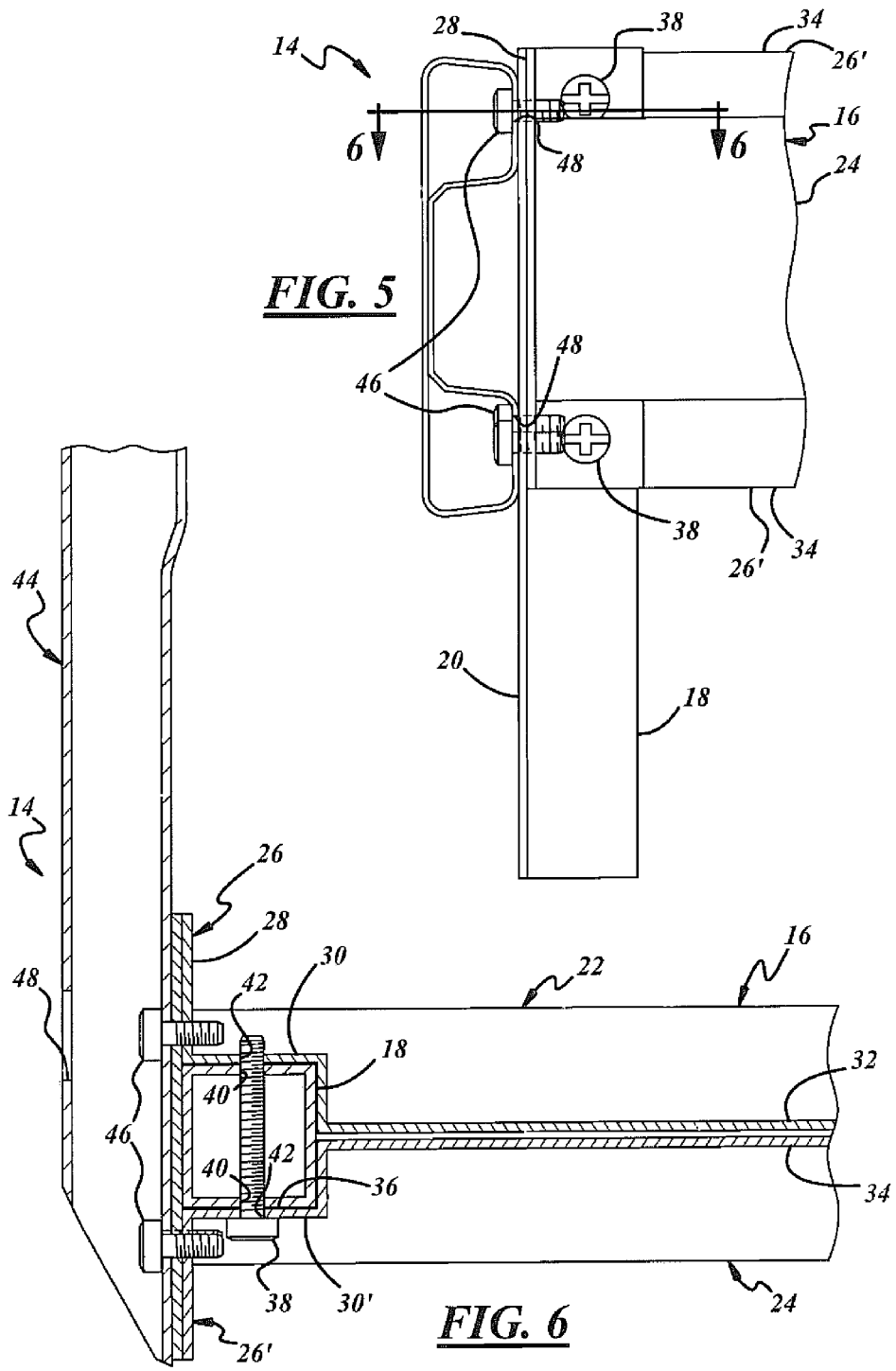

UNDERRUN ENERGY-ABSORBING STRUCTURE FOR A VEHICLE

TECHNICAL FIELD

The present invention relates generally to energy-absorbing structures for vehicles, and more particularly to an underrun energy-absorbing structure with fewer parts and shorter assembly time, as compared with conventional energy absorbing structures.

BACKGROUND

Light truck vehicles (LTV's) with energy-absorbing structures typically decrease vehicle underrun in collisions with smaller passenger cars. To that end, energy-absorbing structures typically extend downward from the vehicle frame of the LTV. Current energy-absorbing structures include a blocker beam and complex bracketry. Blocker beam typically extends between rails and is offset downward from the vehicle frame for blocking the smaller passenger vehicle. The complex bracketry typically attaches blocker beam to the vehicle frame.

Blocker beam and bracketry typically add a significant amount of weight to the vehicle. The bracketry typically includes a high number of parts, which can increase in-plant processing time and manufacturing costs.

It would therefore be desirable to provide an underrun protection energy-absorbing structure that has a simple and robust construction with a substantially lighter overall mass and fewer parts, as compared with conventional energy-absorbing structures.

SUMMARY OF THE INVENTION

An underrun energy-absorbing structure ("structure") for a vehicle is provided. The structure includes a rail member, a deformable crush tube, and a plate. Rail member is formed from an inboard panel and an outboard panel. Crush tube is sandwiched between inboard panel and outboard panel and extends perpendicularly from rail member. Plate is adjacent to crush tube and extends perpendicularly from rail member. Plate is supported by crush tube during a vehicle collision.

One advantage of the invention is that a structure is provided that decreases vehicle underrun during collisions between LTV's and smaller passenger vehicles.

Another advantage of the invention is that a structure is provided that has a lighter construction with fewer parts, as compared with conventional energy-absorbing constructions.

Yet another advantage of the invention is that a structure is provided that has a substantially short manufacturing cycle time.

Other advantages of the present invention will become apparent upon considering the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of the examples of the invention:

FIG. 5 is a side view of the structure shown in FIG. 2; and

FIG. 6 is a cross-sectional view of the structure shown in FIG. 5, taken along line 6-6.

DETAILED DESCRIPTION OF THE INVENTION

Figure 1:
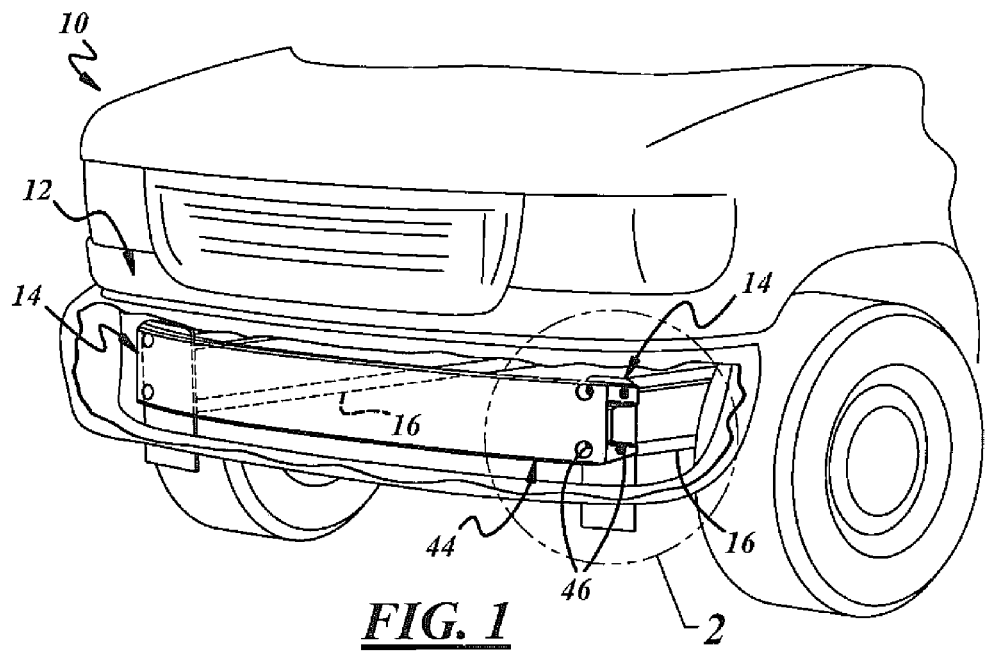
FIG. 1 is a cutaway perspective view of a light truck vehicle ("LTV") having a vehicle frame with two underrun energy-absorbing structures ("structure"), according to one embodiment of the invention.

In the following figures, the same reference numerals are used to identify the same components in the various views.

Referring to FIG. 1, there is shown a light truck vehicle 10 ("LTV") having a frame 12 with two energy-absorbing structures 14 ("structure"), according to one embodiment of the invention. As detailed below, structure 14 has a simple and robust construction formed from fewer parts, as compared with conventional energy-absorbing structures. These features are beneficial for reducing in-plant processing time, minimizing costs associated therewith, decreasing overall vehicle weight, and enhancing vehicle performance.

Figure 2:
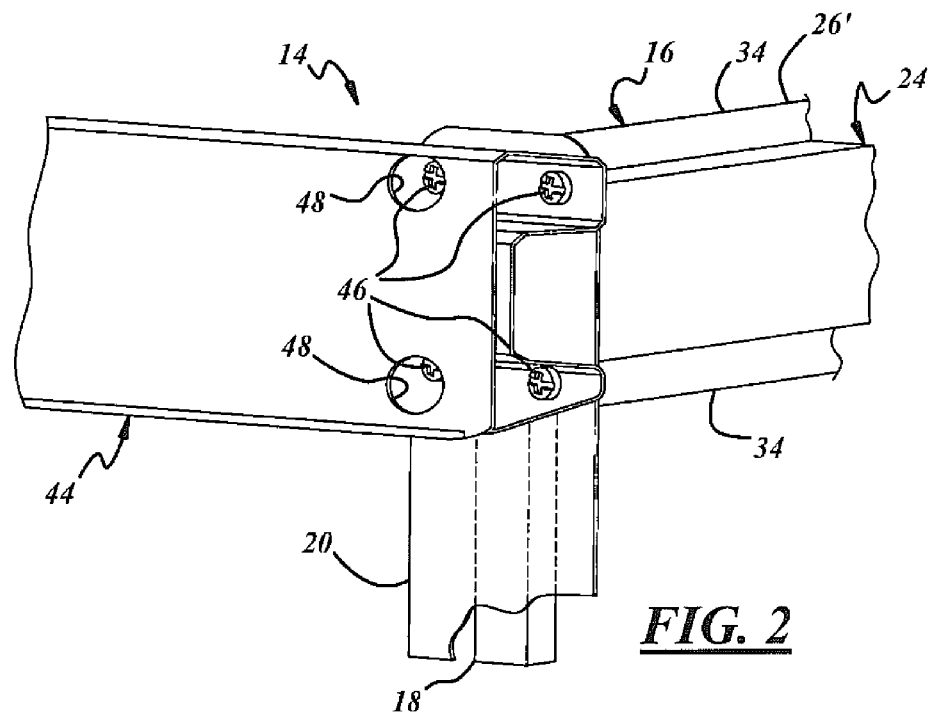
FIG. 2 is an enlarged perspective view of one of the structures shown in FIG. 1.
Figure 3:
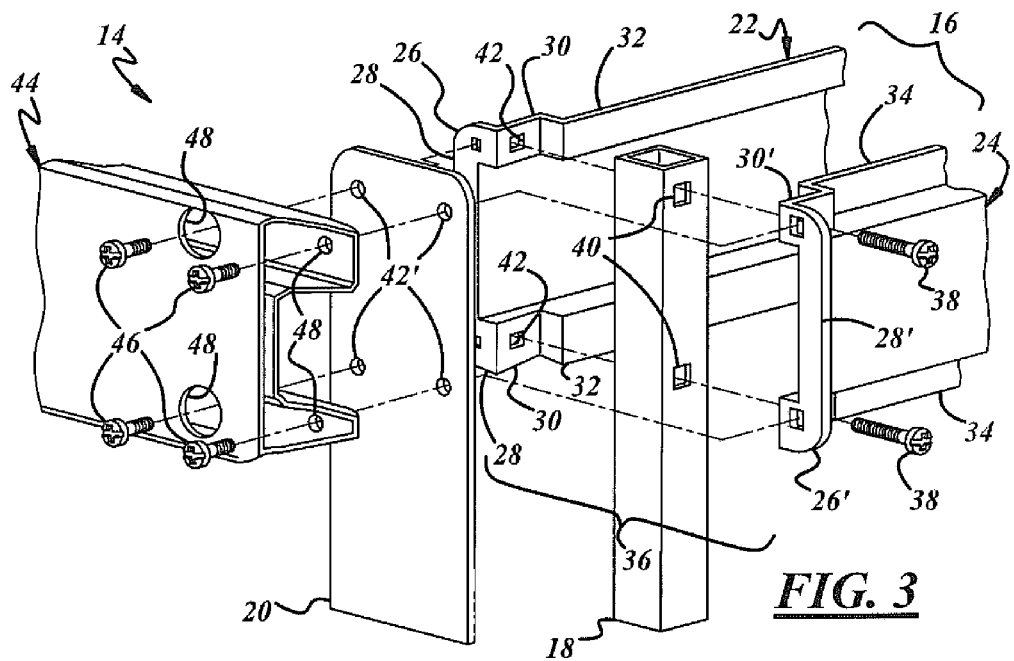
FIG. 3 is an exploded view of the structure shown in FIG. 2.
Figure 4:
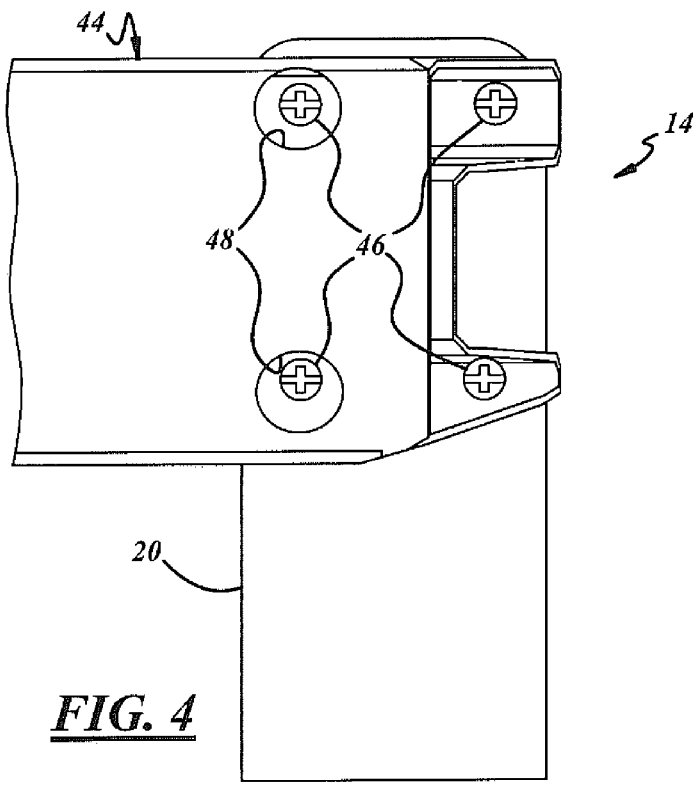
FIG. 4 is a front view of the structure shown in FIG. 2.

As illustrated in FIGS. 2 and 3, each structure 14 includes a rail member 16, a deformable crush tube 18 ("crush tube"), and a plate 20. Plate 20 extends perpendicularly from rail 16 by a predetermined distance for blocking a smaller passenger vehicle during a collision with LTV 10. Plate 20 is supported by crush tube 18 for managing the crash energy.

Rail member 16 is formed from an inboard panel 22 and an outboard panel 24. Inboard panel 22 is welded or otherwise suitably attached to outboard panel 24. In the illustrated embodiment, inboard panel 22 and outboard panel 24 each have stepped flanges 26, 26'. In particular, stepped flange 26 for inboard panel 22 includes a mounting flange 28, a seat 30, and a pair of inboard flanges 32. Likewise, stepped flange 26' for outboard panel 24 includes a mounting flange 28', a seat 30', and a pair of outboard flanges 34, which are welded or otherwise suitably attached to inboard flanges 32.

Seats 30, 30' of rail 16 form a notch 36 receiving crush tube 18. As illustrated in FIGS. 3 and 6, notch 36 is shaped for receiving crush tube 18 with a square cross-sectional shape. However, it is contemplated that notch 36 and crush tube 18 can have a variety of other suitable shapes. Crush tube 18 is attached to seats 30, 30' by a pair of bolt fasteners 38. In this respect, crush tube 18 has two or more openings 40 for receiving bolt fasteners 38. Likewise, each seat 30, 30' has a hole 42 for receiving respective bolt fasteners 38. It is understood that crush tube 18 can be attached to rail 16 by a variety of other suitable methods as desired.

Mounting flanges 28, 28' of rail 16 are attached to plate 20. In the illustrated embodiment, plate 20 is welded to mounting flanges 28, 28' but can be otherwise suitably mounted to rail 16 as desired. As shown in FIG. 5, plate 20 extends perpendicularly from rail 16 by a predetermined length for blocking a smaller passenger vehicle. Crush tube 18 is adjacent to plate 20 and supports plate 20 in a vehicle collision so as to absorb crash energy.

Referring back to FIG. 1, a blocker beam 44 is attached to structures 14 and extends between rails 16. Blocker beam 44 is coplanar with rails 16. However, it is contemplated that blocker beam 44 can instead be offset from rails 16. Blocker beam 44 is attached to the structures 14 by a series of bolt members 46. In particular, as best shown in FIG. 5, blocker beam 44 has opposing end portions, each with a series of apertures 48 receiving the bolt members 46. Likewise, plate 20 and mounting flanges 28, 28' respectively define holes 42 receiving the bolt members 46.

While particular embodiments of the invention have been shown and described, it will be understood, of course, that the invention is not limited thereto since modifications may be made by those skilled in the art, particularly in light of the foregoing teachings. Accordingly, it is intended that the invention be limited only in terms of the appended claims.

What is claimed is:

1. An underrun energy-absorbing structure for a vehicle, comprising:
    a rail member formed from an inboard panel and an outboard panel;
    a deformable crush tube sandwiched between said inboard panel and said outboard panel;
    said deformable crush tube extending perpendicularly from said rail member; and
    a plate adjacent to said deformable crush tube and extending perpendicularly from said rail member by a predetermined distance;
    said deformable crush tube supporting said plate in a vehicle collision.

2. The underrun energy-absorbing structure recited in claim 1 wherein said inboard panel and said outboard panel define a notch receiving said deformable crush tube.

3. The underrun energy-absorbing structure recited in claim 1 wherein said inboard panel has a pair of inboard flanges attached to a pair of outboard flanges for said outboard panel.

4. The underrun energy-absorbing structure recited in claim 3 wherein said pair of inboard flanges is welded to said pair of outboard flanges.

5. The underrun energy-absorbing structure recited in claim 2 wherein said inboard panel and said outboard panel have a pair of mounting flanges attached to said plate.

6. The underrun energy-absorbing structure recited in claim 5 wherein said plate is welded to said pair of mounting flanges.

7. A vehicle frame comprising:
    a pair of said underrun energy-absorbing structures recited in claim 1; and
    a blocker beam attached to said pair of plates;
    said blocker beam extending between said pair of rail members.

8. The vehicle frame recited in claim 7 wherein said blocker beam and said pair of rail members are co-planar.

9. The underrun energy-absorbing structure recited in claim 8 wherein said pair of plates extend from said blocker beam.

10. An underrun energy-absorbing structure for a vehicle, comprising:
    a rail member formed from an inboard panel and an outboard panel;
    said inboard panel and said outboard panel each having a stepped flange;
    said stepped flange defining a seat;
    a deformable crush tube in said seat and sandwiched between said inboard panel and said outboard panel;
    said deformable crush tube extending perpendicularly from said rail member; and
    a plate adjacent to said deformable crush tube and extending perpendicularly from said rail member by a predetermined distance;
    said deformable crush tube supporting said plate in a vehicle collision.

11. The underrun energy-absorbing structure recited in claim 10 wherein said seat defines at least one hole receiving at least one bolt fastener and attaching said deformable crush tube to said rail member.

12. The underrun energy-absorbing structure recited in claim 11 wherein said deformable crush tube defines at least one opening receiving said at least one bolt fastener.

13. A vehicle frame comprising:
    a pair of said underrun energy-absorbing structures recited in claim 10; and
    a blocker beam attached to said pair of plates;
    said blocker beam extending between said pair of rail members.

14. The vehicle frame recited in claim 13 wherein said blocker beam and said pair of rail members are co-planar.

15. An underrun energy-absorbing structure for a vehicle, comprising:
    a rail member formed from an inboard panel and an outboard panel;
    a deformable crush tube sandwiched between said inboard panel and said outboard panel;
    said deformable crush tube extending perpendicularly from said rail member;
    a plate adjacent to said deformable crush tube and extending perpendicularly from said rail member by a predetermined distance;
    said deformable crush tube supporting said plate in a vehicle collision;
    a first series of bolt members attaching said deformable crush tube to said rail member; and
    a second series of bolt members attaching said plate to said rail member.

16. The underrun energy-absorbing structure recited in claim 15 wherein said inboard panel and said outboard panel each have a stepped flange with a seat receiving said deformable crush tube.

17. The underrun energy-absorbing structure recited in claim 16 wherein said seat includes at least one hole receiving said first series of bolt members.

18. The underrun energy-absorbing structure recited in claim 15 further comprising a mounting flange extending from said seat and attached to said plate.

19. The underrun energy-absorbing structure recited in claim 18 wherein said mounting flange defines a series of openings for receiving a second series of bolt members and attaching said plate to said rail member.

20. A vehicle frame comprising:
    a pair of said underrun energy-absorbing structures recited in claim 19; and
    said blocker beam extending between said pair of rail members;
    a blocker beam attached to said pair of plates;
    said blocker beam having a series of holes;
    said mounting flange having a series of openings;
    said series of openings and said series of holes receiving said second series of bolt members attaching said blocker beam and said pair of plates to said pair of rail members;
    said blocker beam coplanar with said pair of rail members.

* * * * *